(No Model.)
T. W. DE TRAY.
MILK COOLER.
No. 306,388. Patented Oct. 14, 1884.
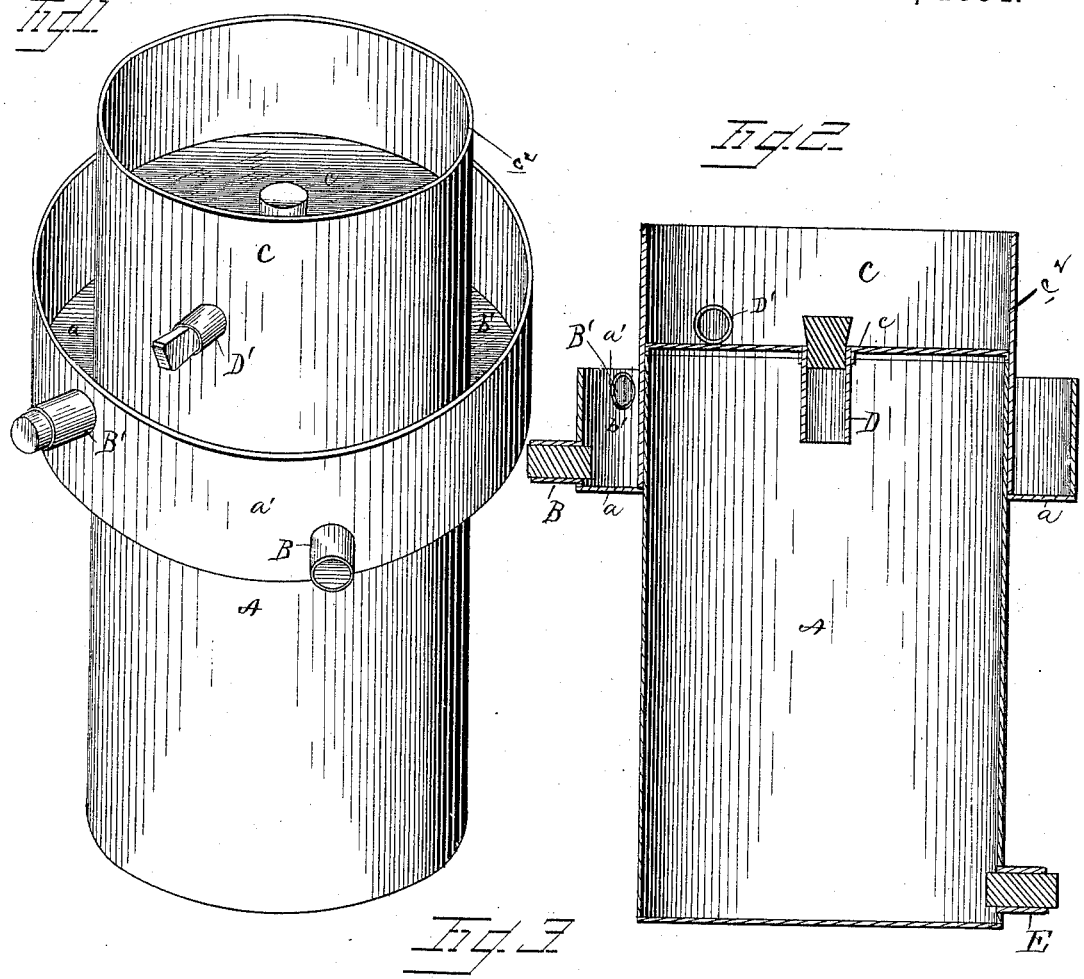
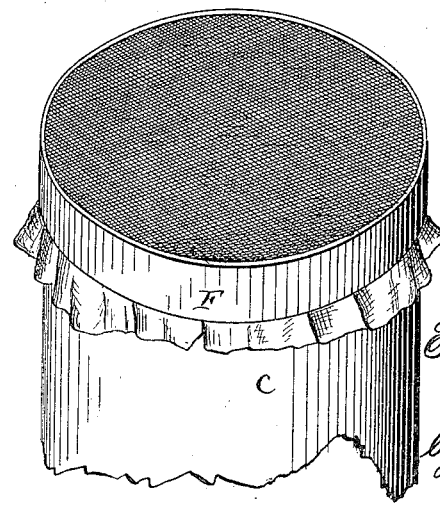
WITNESSES
F. L. Durand
E. G. Siggers
T. W. De Tray
INVENTOR
by A. Snow & Co
Attorneys

UNITED STATES PATENT OFFICE.

TRUMAN W. DE TRAY, OF TOLEDO, OHIO.

MILK-COOLER.

SPECIFICATION forming part of Letters Patent No. 306,388, dated October 14, 1884.

Application filed October 10, 1883. (No model.)

*To all whom it may concern:*

Be it known that I, TRUMAN W. DE TRAY, a citizen of the United States, residing at Toledo, in the county of Lucas and State of Ohio, have invented a new and useful Milk-Cooler, of which the following is a specification, reference being had to the accompanying drawings.

My invention relates to coolers for milk and other articles, the object being to provide a device of this character of simple, inexpensive, and durable construction.

The invention consists in the improved construction and combinations of parts hereinafter fully described, and pointed out in the claim.

In the drawings, Figure 1 is a perspective view of my improved cooler. Fig. 2 is a vertical section of the same. Fig. 3 is a detail view showing a strainer applied in position for operation.

A represents the can or vessel proper, which is made of any suitable material. Near the upper edge of said vessel A is secured a flange, $a$, having a collar or rim, $a'$, which form a separate compartment from the vessel A, adapted to receive water for cooling the contents of said can.

B B' represent tubes or spouts connecting with the compartment $b'$, the lower tube or spout, B, being an inlet-tube, and the upper spout, B', being an outlet or escape tube. The edge of the can proper projects above the edge of the rim $a$, and when the water has reached a level with the spout B' it will escape and prevent the water from entering the vessel.

C represents the cover, which is adapted to fit the top of the can A. This cover is divided into two compartments or sections by a disk, $c$.

D represents a tube or spout secured to the disk and projecting downwardly therefrom. The disk $c$ is perforated to register with said tube D.

D' represents a spout secured to the cover C on the outside thereof, communicating with the interior of the cover just above the disk $c$, and adapted to receive a plug or stopper.

E represents a spout or tube formed near the bottom of the can A, and which serves as an outlet for the milk when cooled.

The operation is as follows: The vessel or can A is placed in a tank or vessel in which water has been placed, and of a sufficient depth to enter the tube or spout B, and circulates in the space or compartment $b'$, and when it reaches the height of the tube B' it will be carried off thereby. The tank in which the vessel is placed is provided with a suitable supply and an outlet pipe, so that water is constantly fed to said tank, and a perfect circulation in the compartment $b'$ insured. The compartment $C^2$ of the cover C is adapted to receive ice or other cooling agent, and as the warm air ascends it is cooled thereby. When it is desired to strain the milk into the vessel A, the plug of the tube D is withdrawn, and the collar or rim F removed. A suitable flexible strainer is then placed on the edges of the rim and the collar F replaced, thus securely retaining the strainer against any displacement. The milk may then be poured in said strainer, and from thence it descends to the vessel A through the tube D. When it is thought the milk has become sufficiently cooled, it may be drawn off by means of the spout E.

It will be obvious that my device is applicable to the cooling of other articles as well as milk, and that its construction is simple and durable.

Having fully described my invention, what I claim as new, and desire to secure by Letters Patent, is—

In a cooler for milk and the like, the combination, with the vessel A, having the enlarged external encircling compartment, $b'$, around its upper portion, provided with the lower inlet-pipe, B, and the upper outlet-pipe, B', whereby a constant circulation of cold water is permitted through said compartment $b'$, of the cover C, having the centrally-perforated disk or diaphragm $c$, located about midway between the upper and lower edges of said cover, and provided with the vertical tube D, communicating with the interior of the vessel A, and the outlet-tube just above the disk $c$, substantially as specified.

In testimony that I claim the foregoing as my own I have hereto affixed my signature in presence of two witnesses.

TRUMAN W. DE TRAY.

Witnesses:
JOHN C. LEE,
J. M. BROWN.